United States Patent [19]
Webb et al.

[11] Patent Number: 5,896,170
[45] Date of Patent: Apr. 20, 1999

[54] DYNAMIC ALIGNMENT OF CATHODE RAY TUBE RASTERS

[75] Inventors: James R. Webb, Boulder; Ron C. Simpson, Erie, both of Colo.

[73] Assignee: Display Laboratories, Inc., Boulder, Colo.

[21] Appl. No.: 08/674,394

[22] Filed: Jul. 2, 1996

[51] Int. Cl.$^6$ .................................................. H04N 17/00
[52] U.S. Cl. ........................................... 348/190; 348/806
[58] Field of Search .................................... 348/189, 190, 348/806, 807, 745, 746, 747, 178, 182, 191; 315/1, 3, 7, 364, 365, 366, 367, 370, 371; H04N 17/00, 3/22, 3/23, 3/223; H01J 23/16, 23/34, 25/00; G09G 1/04; G06F 3/153

[56] References Cited

U.S. PATENT DOCUMENTS

| | | | |
|---|---|---|---|
| 3,720,860 | 3/1973 | Wadlow | 315/370 |
| 3,995,269 | 11/1976 | Schumacher | 348/184 |
| 4,058,826 | 11/1977 | Schneider | 348/184 |
| 4,314,179 | 2/1982 | Tooyama et al. | 348/806 |
| 4,506,292 | 3/1985 | Newton et al. | 348/692 |
| 4,523,188 | 6/1985 | Huber | 340/113 |
| 4,649,324 | 3/1987 | Guerra et al. | 348/189 |

(List continued on next page.)

FOREIGN PATENT DOCUMENTS

| | | |
|---|---|---|
| 0404700 | 12/1990 | European Pat. Off. . |
| 0448267 | 9/1991 | European Pat. Off. . |
| 0257096 | 11/1986 | Japan . |

OTHER PUBLICATIONS

James R. Webb; Micro–Chip Architecture for Full Digital Control of Geometry, Convergence and Colorimetry in CRT Monitors, Jun. 1994.

Charles Chuang et al; A Non–impact High Resolution Geometry Alignment System for Monitor Production. Paper given at Society for Information Display, San Jose, California, Jun. 1994.

Society for Information Display International Symposium, Digest of Technical Papers, vol. XXV, Jun. 14–16, 1994.

CRT Display Inspection with a Solid State Camera, by Gregory A. Kern. Paper given at Society for Information Display, San Jose, California, Jun. 1994.

Firmware for a Continuous Frequency CRT Monitor, by Steven J. Lassman. Paper given at Society for Information Display, San Jose, California, Jun. 1994.

Society for Information Display, Digest of Technical Papers, Feb. 6–8, 1996.

IEEE 1988 International Conference on consumer Electronics, Jun. 8–10, 1988.

W. Press, S. Teukolsky, W. Vetterling and B. Flannery, Numerical Recipes in C—the Art of Scientific Computing at 123–128 (2nd ed. 1988).

SGS Thompson Catalog of Components for Multisync Monitors.

Display Laboratories, Inc., Minicam Automated Monitor Alignment & Inspection System, 1994.

Display Laboratories, Inc., DLAB43A, Advanced Information, 1995.

Display Laboratories, Inc., DLAB62A, Advanced Information, 1995.

Display Laboratories, Inc., DLAB494, Advanced Information, 1995.

Display Laboratories, Inc. DLAB520A, Advanced Information, 1995.

*Primary Examiner*—Victor R. Kostak
*Attorney, Agent, or Firm*—William W. Cochran, II; Holland & Hart LLP

[57] ABSTRACT

A system for synchronous alignment of cathode ray tube (CRT) rasters by application of time variable rotation driver signals to the CRT rotation coil during trace of the raster. The system may be implemented by either digital or analog means of measuring and storing cathode ray tube raster distortion data as rotational correction factor data. The rotational correction factor data is used by device circuitry to generate and apply the required time variable rotation driver signals, to the CRT rotation coil, to effect the desired CRT raster alignment.

34 Claims, 9 Drawing Sheets

U.S. PATENT DOCUMENTS

| | | | |
|---|---|---|---|
| 4,654,706 | 3/1987 | Davidson et al. | 348/190 |
| 4,672,275 | 6/1987 | Ando | 348/190 X |
| 4,757,239 | 7/1988 | Starkey | 315/371 |
| 4,772,948 | 9/1988 | Irvin | 348/177 |
| 4,816,908 | 3/1989 | Colineau et al. | 348/747 |
| 4,817,038 | 3/1989 | Knoll et al. | 250/363.09 |
| 4,857,998 | 8/1989 | Tsujihara et al. | 348/190 X |
| 4,897,721 | 1/1990 | Young et al. | 348/190 |
| 4,952,851 | 8/1990 | Macaulay | 315/398 |
| 5,020,116 | 5/1991 | Macaulay | 382/162 |
| 5,059,979 | 10/1991 | Micic et al. | 341/152 |
| 5,081,523 | 1/1992 | Frazier | 348/178 |
| 5,216,504 | 6/1993 | Webb et al. | 348/190 |
| 5,276,458 | 1/1994 | Sawdon | 345/132 |
| 5,432,548 | 7/1995 | Byen et al. | 348/180 |
| 5,440,340 | 8/1995 | Tsurutani et al. | 348/190 |
| 5,504,521 | 4/1996 | Webb et al. | 348/180 |
| 5,505,521 | 4/1996 | Webb et al. | 348/190 |
| 5,510,833 | 4/1996 | Webb et al. | 358/190 |
| 5,638,461 | 6/1997 | Fridge | 348/190 |

DYNAMIC ALIGNMENT OF CATHODE RAY TUBE RASTERS

BACKGROUND OF THE INVENTION

A. Field of Invention

This invention pertains generally to cathode ray tube (CRT) signal alignment and more particularly to dynamic rotation of the raster upon the face of a CRT.

B. Definitions

Align means to cause a video image to be adjusted so that distortion characteristics are minimized and the video image that is displayed on the cathode ray tube forms an image that is pleasing to the eye.

Alignment camera means the video camera used to generate a signal that is representative of the image displayed on the cathode ray tube in a manner described in U.S. Pat. No. 5,216,504.

Bar code means any sort of optically encoded data.

Cathode ray tube means the tube structure, the phosphor screen, the neck of the tube, the deflection and control windings, including the yoke, rotation and other coils, and the electron guns.

Characterization module means a device that is coupled in some manner to a cathode ray tube and may include a storage device for storing correction factor data or an identification number for the cathode ray tube, and/or a processing device such as a micro-processor or other logic device, and/or driver and correction circuits, and/or control circuitry. The characterization module can also store term multipliers for use in aligning monitors that employ standard transformation equations.

Coordinate locations means the discrete physical locations on the face of the cathode ray tube, or a physical area on the CRT screen.

Correction and driver circuitry means one or more of the following: digital to analog converters, interpolation engine, pulse width modulators and pulse density modulators, as well as summing amplifiers, oscillators, op-amps, inverters comparators or any other components necessary to produce and condition correction signals to synchronously apply to control circuitry to generate an aligned video image.

Correction control signals means correction factor signals that have been combined in a manner to be applied to either horizontal control circuitry, vertical control circuitry, coils, or electron gun circuitry. Correction factor data comprises the encoded digital bytes or any other form of data, such as term multipliers that adjust standardized transformation equations, that are representative of the amount of correction required to align a video signal at a particular physical location on a cathode ray tube to counteract distortion characteristics at that location. Correction factor data may include data from the gain matrix table, data relating to electron gun characteristics and/or data relating to geometry characteristics of the cathode ray tube.

Correction factor parameters include various geometry characteristics of the cathode ray tube including horizontal size, raster rotation, vertical size, horizontal center, vertical center, pincushioning, vertical linearity, keystoning, convergence, etc., and various electron gun characteristics of the cathode ray tube including contrast, brightness, luminosity, focus, color balance, color temperature, electron gun cutoff, etc.

Correction factor signals means digital correction signals that have been integrated or filtered.

Correction signals means digital correction signals and correction factor signals.

Decoder means a device for generating an electronic signal in response to one or more data bytes that may include PWMs, PDMs, DACs, interpolation engines, on screen display chips, etc.

Device means any apparatus which incorporates a cathode ray tube as part of its implementation.

Digital correction signals means signals that are generated by decoders, such as pulse width modulators, pulse density modulators, digital to analog converters, etc. in response to correction factor data.

Digital monitor board means a circuit board that includes one or more of the following: vertical control circuitry, horizontal control circuitry, electron gun control circuitry, correction and driver circuitry, a logic device, digital to analog converters, and a memory. A Digital monitor board may comprise an actual chassis monitor board used with a particular monitor, an ideal chassis board, a chassis board that can be adjusted to match the characteristics or specifications of a particular monitor board, etc.

Digitized signal is any electrical signal that has a digital nature.

Direction means up, down, left, right, clockwise anti-clockwise, brighter, dimmer, higher, lower, etc.

Discrete locations may mean individual pixels on a cathode ray tube screen or may comprise a plurality of pixels on a cathode ray tube screen.

Distortion characteristics means the amount of any particular type of distortion as indicated by the distortion data measured at a number of different points on the cathode ray tube.

Distortion data is a measure of the amount of distortion that exists on a cathode ray tube with regard to the geometry characteristics of he tube, and/or electron gun characteristics of the tube. For example, distortion data can be measured as a result of misalignment of a video image or improper amplitude or gain of a video signal. Distortion data can be a quantative measure of the deviation of correction factor parameters from a desired quantative value. Distortion data can be measured at coordinate locations on the cathode ray tube.

Driver signals are the electrical signals that are used to drive the deflection and control windings, and electron guns of the cathode ray tube.

Frame grabber means an electronic device for capturing a video frame.

Gain matrix table means a table of values that are used to indicate how a change in correction factor data for one correction factor parameter influences the change in the correction factor data for other correction factor parameters, as disclosed in U.S. patent application Ser. No. 08/611,098, filed Mar. 5, 1996, entitled "Method and Apparatus for Making Corrections in a Video Monitor".

Internal to raster means any part or section of a CRT raster as defined by its location on the raster.

Interpolation engine means a device for generating continuously variable signals, such as disclosed in U.S. patent application Ser. No. 08/613,902 filed Mar. 11, 1996 by Ron C. Simpson entitled "Interpolation Engine for Generating Gradients."

Logic Device means any desired device for reading the correction factor data from a memory and transmitting it to correction and driver circuitry, including a micro-processor, a state machine, or other logic devices.

Magnetic strip means any sort of magnetic storage medium that can be attached to a cathode ray tube.

Maximum correctable distortion data means the limits of the distortion data for which an aligned video signal can be generated for any particular cathode ray tube using predetermined correction and driver circuitry, and control circuitry.

Memory comprises any desired storage medium including, but not limited to, EEPROMs, RAM, EPROMs, PROMs, ROMs, magnetic storage, magnetic floppies, bar codes, serial EEPROMs, flash memory, etc.

Non-volatile electronic storage device means an electrical memory device that is capable of storing data that does not require a constant supply of power.

Pattern generator means any type of video generator that is capable of generating a video signal that allows measurement of distortion data.

Processor means a logic device including, but not limited to state machines, micro-processors, etc.

Pulse density modulation (PDM) means a device for generating pulse density modulation signals in response to one or more data bytes, such as disclosed in U.S. patent application Ser. No. 08/611,098, filed Mar. 5, 1996 by James R. Webb et al. entitled "Method and Apparatus for Making Corrections in a Video Monitor".

Pulse width modulator (PWM) means a device that generates pulse width modulated signals in response to one or more data bytes, such as disclosed in U.S. patent application Ser. No. 08/611,098, filed Mar. 5, 1996 that is cited above and U.S. Pat. No. 5,216,504.

Raster means all or part of the horizontal traces produced on the face of a CRT.

Rotation coil means a coil or winding used to rotate the raster in a CRT.

Rotational correction factor data means electronic data generated by a vision system in response to rotational distortion characteristic measurements obtained the vision system. The rotational correction factor data may be stored as term multipliers which are used to modify standardized transformation equations and parametric data as disclosed in U.S. Pat. No. 5,216,504, issued Jun. 1, 1993 entitled "Automatic Precision Video Monitor Alignment System". Alternatively rotational correction factor data may be obtained by screen mapping with a vision system and stored for later use as disclosed in U.S. patent application Ser. No. 08/638,222 filed Apr. 26, 1996, entitled "Screen Mapping of a Cathode Ray Tube".

Rotational distortion characteristics means the amount of rotational distortion as indicated by the rotational distortion data measured at a number of different points on a cathode ray tube.

Rotational distortion data is a measure of the amount of rotational distortion that exists on a specific cathode ray tube with regard to the geometry characteristics of the tube. For example, rotational distortion data can be a result of misalignment of a video image on the face of the CRT. Rotational distortion data can be a quantitative measure of the deviation of rotational correction factor data from a desired quantitative value. Rotational distortion data can be measured at coordinate locations on the cathode ray tube.

Rotation driver signals means time dependent analog signals generated, by various methods, and applied synchronously to the CRT rotation coil to dynamically align traces of the CRT raster display.

Storage disk comprises any type of storage device for storing data including magnetic storage devices such as floppy disks, optical storage devices, magnetic tape storage devices, magneto-optical storage devices, compact disks, etc.

Term multipliers means factors generated by measuring distortion characteristics of a CRT for use with transformation equations to produce a correction signal.

Time Variable Rotation Driver Signal means a changing level correction signal, with a maximum period of one vertical CRT scan, applied to a coil of a CRT to rotate the horizontal traces of the electron beam on the CRT face.

Transformation equation means a standard form equation for producing a correction voltage waveform to correct common distortion characteristics of a cathode ray tube.

Variable Resistor means an apparatus capable of producing a changeable value of electrical resistance.

Video image means the displayed image that appears on the cathode ray tube screen that is produced in response to a video signal.

Video pattern is the video image of a pattern that appears on the cathode ray tube raster as a result of the video signal generated by the pattern generator.

Video signal means the electronic signal that is input to the electron guns of the cathode ray tube.

Vision System means any automated method for measuring CRT distortion characteristics generating distortion data and producing correction factor data, including rotational correction factor data that is used in the alignment of a raster on a cathode ray tube.

Waveform Generator means an apparatus for producing an electronic signal with a desired shape amplitude and period.

C. Description of the Background

Recent developments in measurement of distortion and automated alignment of CRT displays in devices such as computer monitors and digital television have made it possible and desirable to dynamically correct video displays for various types of distortion. Raster rotational distortion has been a type of distortion that it has not been possible to correct dynamically because of the nature of the distortion and its complex relationship with other CRT alignment parameters. Although rotation coils are provided on many CRT's, these coils have not been able to correct various types of rotational distortion occurring internal to the CRT raster. Correcting internal raster distortion is important in providing overall distortion correction since other correction parameters necessary to minimize display distortion are extremely sensitive to raster rotational distortion.

Heretofore, CRT rasters were rotated statically in an analog circuit by adjusting a variable resistor to supply a direct current (DC) correction level to the CRT rotation coil. This method is inherently limited because the same correction is applied over the whole raster. In other words, the entire raster can be rotated in an attempt to correct rotational distortion. However, rotational distortion often varies significantly over the raster. It is not uncommon for the top of the raster to have a different horizontal alignment than the center or bottom. Since prior art devices have been unable to correct for distortion internal to the raster, it would therefore be desirable to provide a dynamic system to accurately maintain rotational alignment of a CRT raster over the entire raster surface.

SUMMARY OF THE INVENTION

The present invention overcomes the disadvantages and limitations of the prior art by providing a dynamic system to accurately rotate a CRT raster by applying predetermined time variable rotation driver signal synchronously to the CRT rotation coil while the raster is being scanned while maintaining other CRT alignment parameters during the dynamic raster rotation.

The present invention therefore may comprise a method of generating and storing rotational correction factor data relating to the rotational distortion data of a cathode ray tube (CRT) and generating rotational correction factor data for a plurality of discrete locations on the CRT using a vision system or a gain matrix table. The rotational correction factor data may be stored on the CRT or with a digital monitor board for later use in generating the necessary rotation driver signals to align the CRT raster.

The present invention may also comprise a method of visually aligning a cathode ray tube raster by independently aligning various sections of the CRT raster by displaying a suitable raster test pattern on the CRT and visually aligning the test pattern by adjusting a variable resistor provided for each desired raster section. Adjusting these variable resistors generates the time variable rotation driver signal required to synchronously align the desired internal sections of the raster test pattern displayed on the CRT. Finally, the totality of the internally aligned raster may be rotated as desired by adjusting a DC level bias control.

The present invention overcomes the disadvantages and limitations of the prior art by providing a dynamic method of aligning any number of individually defined sections of a CRT raster synchronously while they are being traced and allows compensating adjustments of other affected CRT alignment parameters to maintain complete CRT video image alignment. The system is capable of using either digital or analog waveforms. generated in response to CRT distortion data. to affect dynamic alignment of the CRT raster. Unlike prior static methods of raster rotation, the present invention allows independent dynamic rotation of separately defined CRT raster sections so that the totality of the scans comprising the CRT raster can be synchronously aligned while the raster is being traced.

DETAILED DESCRIPTION OF THE PREFERRED EMBODIMENT OF THE INVENTION

Figure 1:
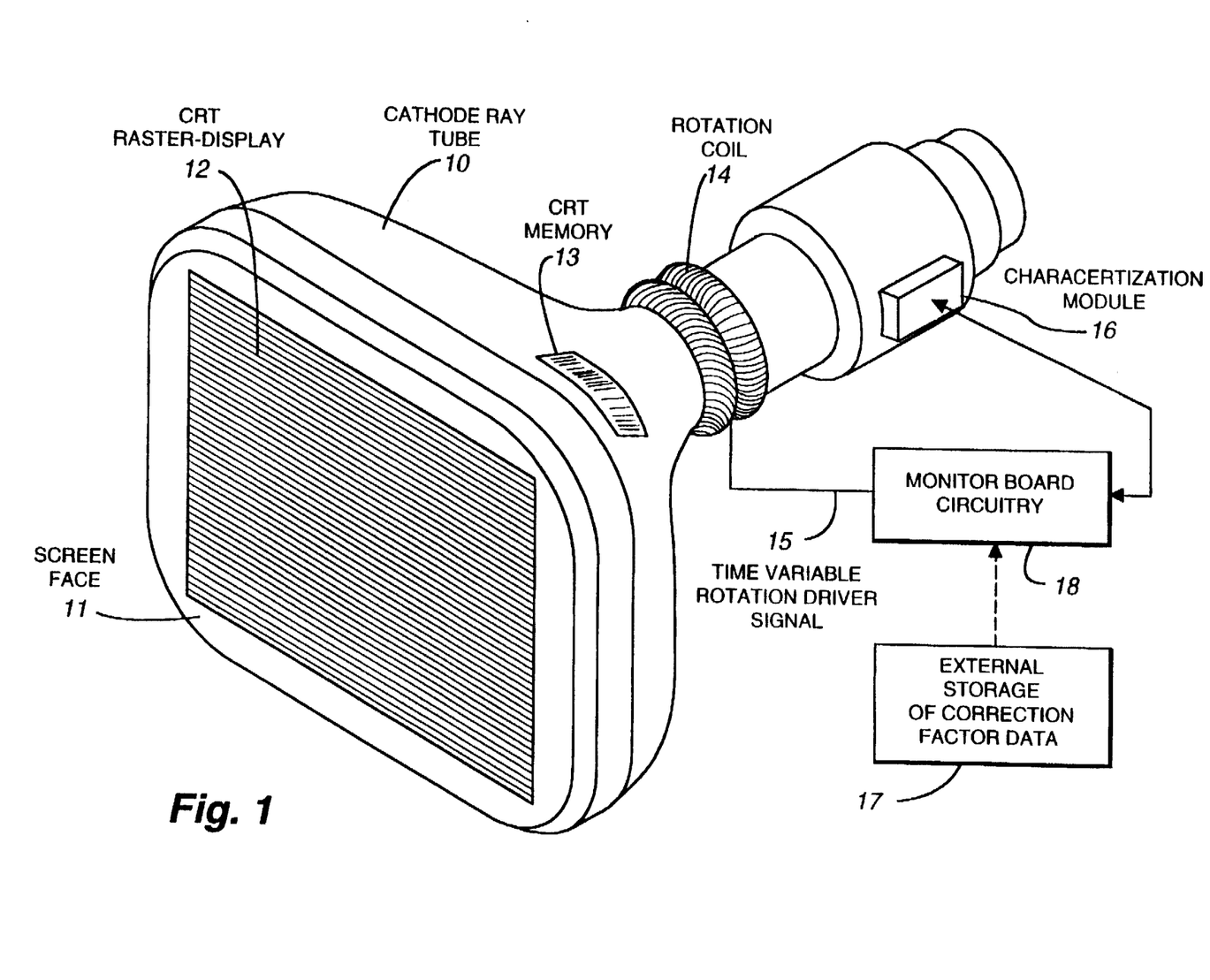
FIG. 1 is a schematic illustration of a raster displayed upon a cathode ray tube (CRT), the CRT rotation coil, and associated signal correction circuitry.

FIG. 1 discloses a cathode ray tube (CRT) 10 having a raster 12 displayed on a screen face 11 of CRT 10 and the associated electronic components necessary to implement the preferred embodiment of the present invention. Numerous and complex interrelationships exist between various horizontal and vertical correction factor parameters (scan geometries) in cathode ray tube image displays and these relationships can be measured and characterized by correction factor data to automate CRT video image alignment. Correction factor data can be derived as disclosed in U.S. Pat. No. 5,216,204 issued to James R. Webb, et al., entitled "Automatic Precision Video Alignment System" that describes the use of a vision system to measure CRT distortion characteristics and is specifically incorporated herein for all it discloses and teaches. When distortion data is obtained with a vision system or derived from a gain matrix table it is stored as correction factor data in a memory 13 associated with the CRT (e.g., characterization module 16, et.) or in the device monitor board circuitry or other location for later retrieval. This correction factor data is then used by device circuitry to generate and apply driver signals as disclosed by and U.S. patent applications Ser. Nos. 08/638,222 filed Apr. 26, 1996 by James R. Webb, et al., entitled "Screen Mapping of a Cathode Ray Tube" and 08/611,098 filed Mar. 5, 1996 by James R. Webb, et al., entitled "Method and Apparatus for Making Corrections in a Video Monitor" which are specifically incorporated herein for all that they disclose and teach. As disclosed herein, these same techniques can be used to store rotational correction factor data in a characterization module 16 that can be mounted on CRT 10 as shown, provided with CRT 10 or imported from external storage 17. Rotational correction factor data are transferred to and interpreted by monitor board circuitry 18 to generate rotation driver signals for each section of the CRT for which the rotational correction factor data has been generated. These rotation driver signals vary through one vertical scan cycle as CRT raster 12 is generated. This results in a rotation driver signal that is a waveform that changes as the CRT raster is scanned. This time variable rotation driver signal generated by the monitor ard circuitry 18 in response to the rotational correction factor data is then synchronously applied to the CRT rotation coil 14, via connection 15, to dynamically align CRT raster 12.

Figure 2:
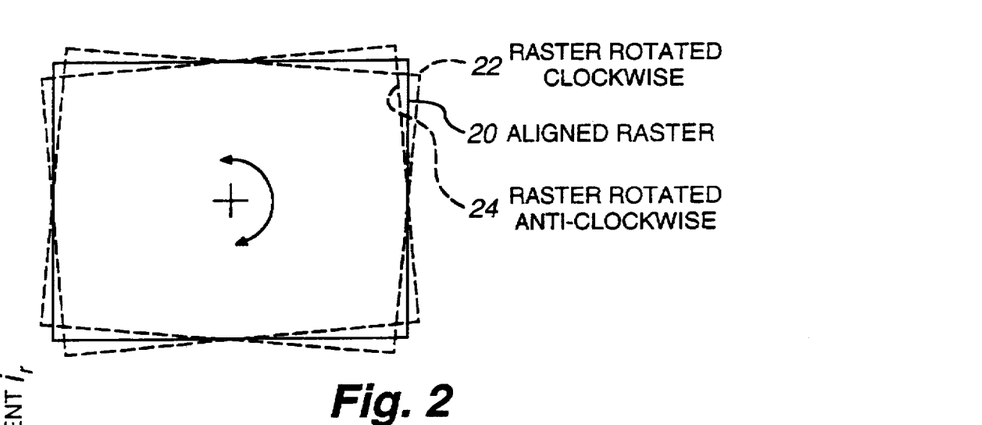
FIG. 2 is a schematic illustration of uniform rotation of an entire raster.
Figure 3:
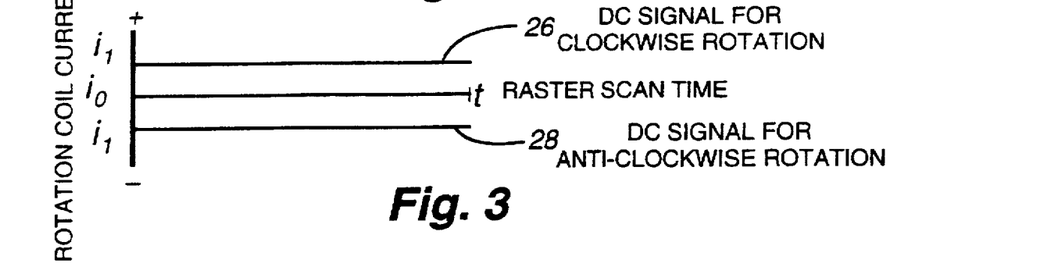
FIG. 3 is a graphical representation of the DC signals applied to the CRT rotation coil for static raster rotation as depicted in FIG. 2.

FIG. 2 is a schematic illustration of a CRT raster that has been rotated using a CRT rotation coil. The CRT raster 20 can be statically rotated clockwise 22 or anti-clockwise 24 by applying a non-time variable (DC) signal 26, that is illustrated in FIG. 3, to the CRT rotation coil 14. This static method of raster rotation is limited in its usefulness as it does not address distortion internal to the CRT raster. For example, if the top and bottom traces of raster 20 are not parallel to one another, this static method of rotation offers no method of correcting internal alignment of the raster.

Figure 4:
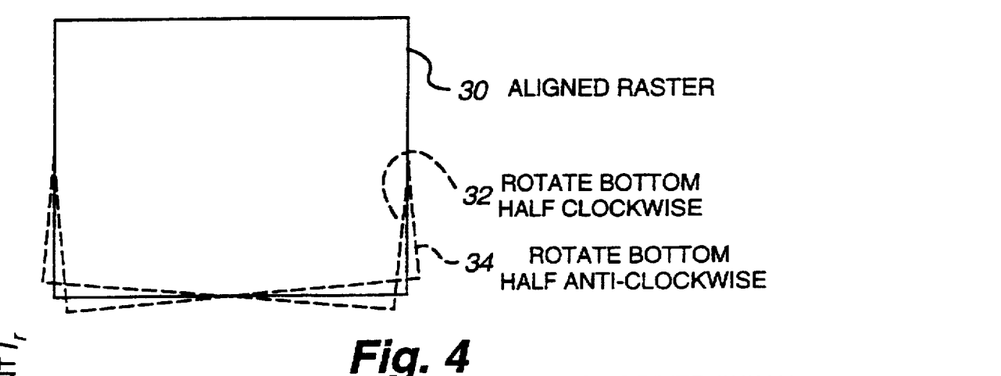
FIG. 4 schematically illustrates the manner in which the present invention can be used to independently rotate the bottom half of a CRT raster.
Figure 5:
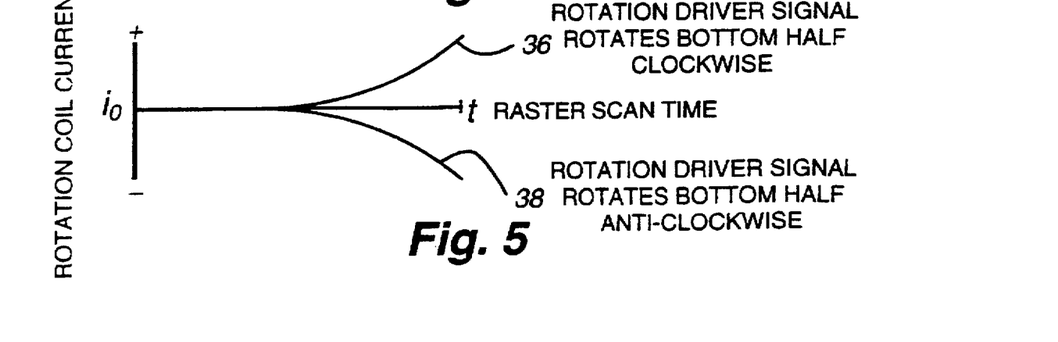
FIG. 5 is a graphical representation of a typical time variable rotation driver signal applied synchronously to independently rotate the bottom half of the CRT raster, as depicted in FIG. 4.

FIG. 4 discloses the manner in which the bottom half of a raster 30 can be rotated either clockwise 32 or anti-clockwise 34 by the application of time variable rotation driver signals 36 and 38, respectively, as shown in FIG. 5.

The time variable rotation driver signals 36 and 38 illustrated in FIG. 5 begin at zero magnitude and have no effect until mid-way through the vertical scan of the CRT. At this time, the time variable rotation driver signals 36 and 38 increase in magnitude smoothly until the end of scan or the bottom of the raster is reached. In this manner signal 36 will rotate the bottom half of raster 30 clockwise when applied to the CRT rotation coil. Likewise, signal 38 will rotate the bottom half of raster 30 anti-clockwise when applied to the CRT rotation coil.

Figure 6:
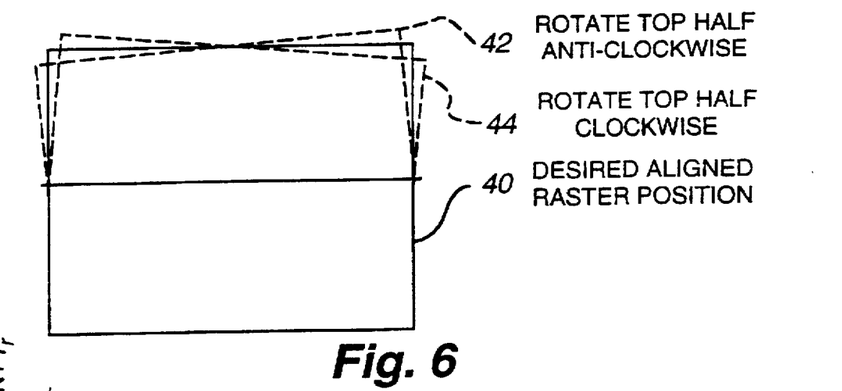
FIG. 6 schematically illustrates the manner in which the present invention can be used to independently rotate the top half of a CRT raster.
Figure 7:
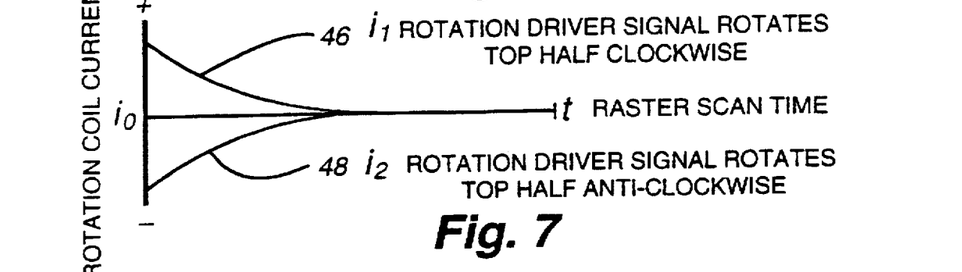
FIG. 7 is a graphical representation of a typical time variable rotation driver signal as applied synchronously to independently rotate the top half of a CRT raster as depicted in FIG. 6.

Similarly, FIG. 6 discloses a method for rotating the top half of a raster 40 either anti-clockwise 42 or clockwise 44 by the synchronous application of the time variable rotation driver signals 46 and 48, respectively, as shown in FIG. 7.

The time variable rotation driver signals 46 and 48 illustrated in FIG. 7 are at maximum magnitude at the start of the raster scan and smoothly change to zero at the midpoint of the raster. In this manner the rotation driver signal 46 when applied to the CRT rotation coil rotates the top half of raster 40 clockwise and rotation driver signal 48 rotates the top half of raster 40 anti-clockwise when applied to the CRT rotation coil.

Figure 8:
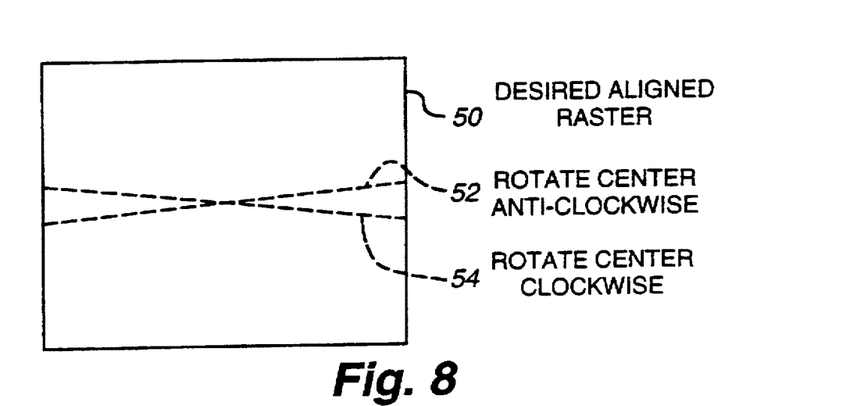
FIG. 8 schematically illustrates the manner in which the present invention can be used to independently rotate the center of a CRT raster.
Figure 9:
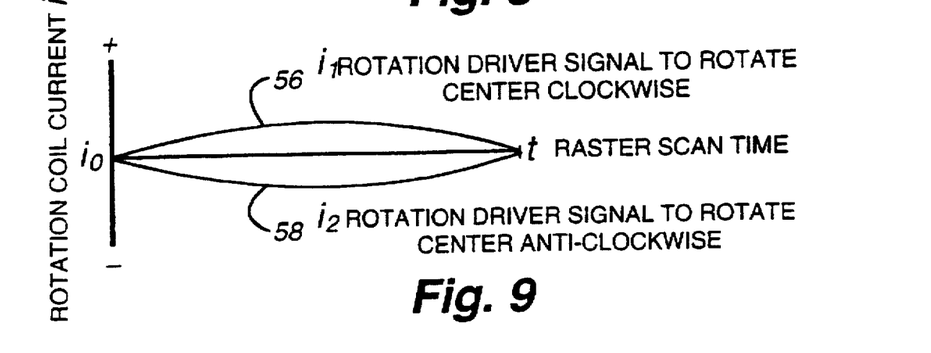
FIG. 9 is a graphical representation of a typical time variable rotation driver signal as applied synchronously to independently rotate the center of a CRT raster, as depicted in FIG. 8.

FIG. 8 discloses the manner in which the present invention may also be used to rotate the center of a CRT raster 50 either in an anti-clockwise direction 52 or a clockwise direction 54 by the application of the time variable rotation driver signals 56 and 58, respectively, as shown in FIG. 9.

The time variable rotation driver signals 56 and 58 illustrated in FIG. 9 begin and end at zero magnitude and are at maximum magnitude at the midpoint of the CRT raster scan. In this way the rotation driver signal 56 when applied to the CRT rotation coil rotates the midsection of raster 50 clockwise and rotation driver signal 58 rotates the midsection of raster 40 anti-clockwise when applied to the CRT rotation coil.

Hence, FIGS. 4 through 9 illustrate that any trace of a CRT raster scanned during a finite time can be rotated as necessary by the synchronous application of the required time variable correction signal to the CRT rotation coil 14.

Figure 10:
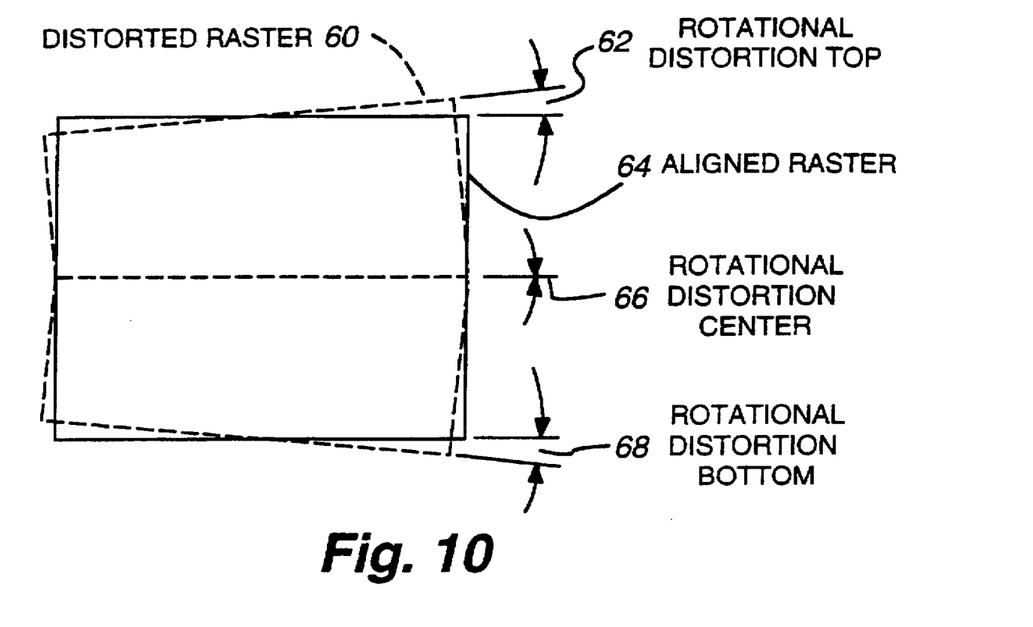
FIG. 10 schematically illustrates the manner in which the present invention can be used to align a typically distorted CRT raster.

FIG. 10 discloses the manner in which the present invention can be used to align a typically distorted CRT raster 60 by measuring rotational distortion data at the top portion of the raster 62, at the center portion of the raster 66, and at the bottom portion of the raster 68. Rotational correction data that is derived from the rotational distortion data is then used to generate a time variable rotation driver signal 70 which, when synchronously applied to the CRT rotation coil 14, aligns the distorted raster 60 to produce an aligned raster 64.

Figure 11:
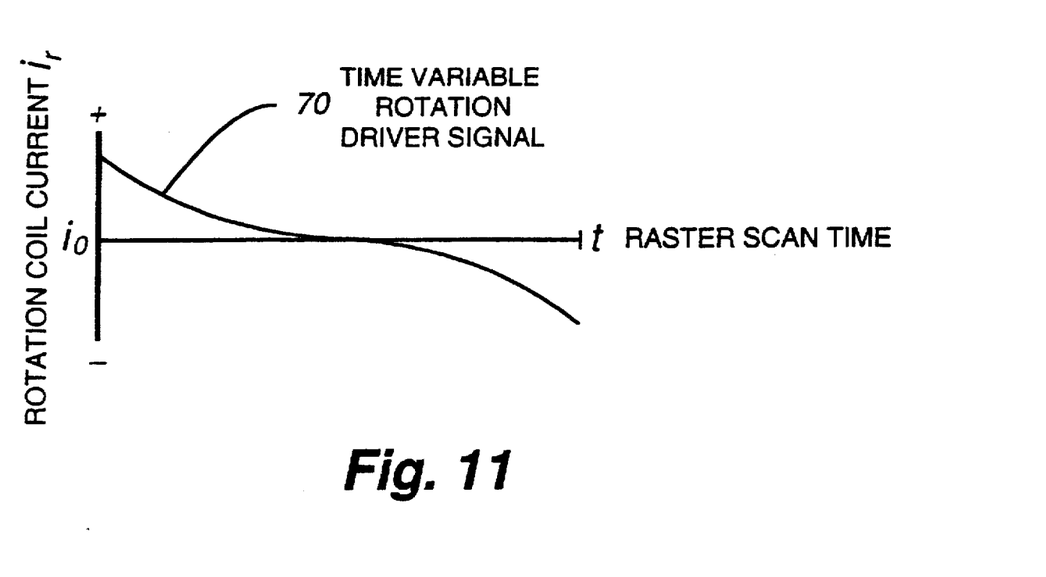
FIG. 11 is a graphical representation of the shape and duration of the time variable signal used to align the raster of the CRT depicted in FIG. 10.

The time variable rotation driver signal 70 illustrated in FIG. 11 begins at a maximum positive value and drops smoothly, passing through zero at the midpoint and reaching a maximum negative magnitude at the end of the raster scan time. Distorted raster 60 is aligned by applying rotation driver signal 70 synchronously to the rotation coil of the CRT displaying raster 60. After application of signal 70 distorted raster 60 is dynamically aligned to become aligned raster 64 as shown in FIG. 10. In this manner signal 70 when applied will rotate each individual scan of distorted raster 60 to cause the alignment of the complete CRT raster.

Although just three sections of raster 60 have been used, as shown in FIG. 10, to illustrate the manner in which driver signals are used to produce an aligned raster 64, any number of sections of the raster 60 could be evaluated for rotational distortion data and used to obtain more detailed rotational correction data which can be filtered and conditioned to produce a smooth, continuous time variable rotation driver signal 70. As may be apparent, the greater the number of raster sections evaluated the more exact the time variable rotation driver signal generated. Also, the interpolation engine disclosed in U.S. patent application Ser. No. 08/613, 902 filed Mar. 11, 1996 entitled "Interpolation Engine for Generating Font Gradients" which is incorporated herein by reference for that all it discloses and teaches, can be used to generate additional data points that comprise interpolated values falling between the measured rotational correction data points.

Figure 12:
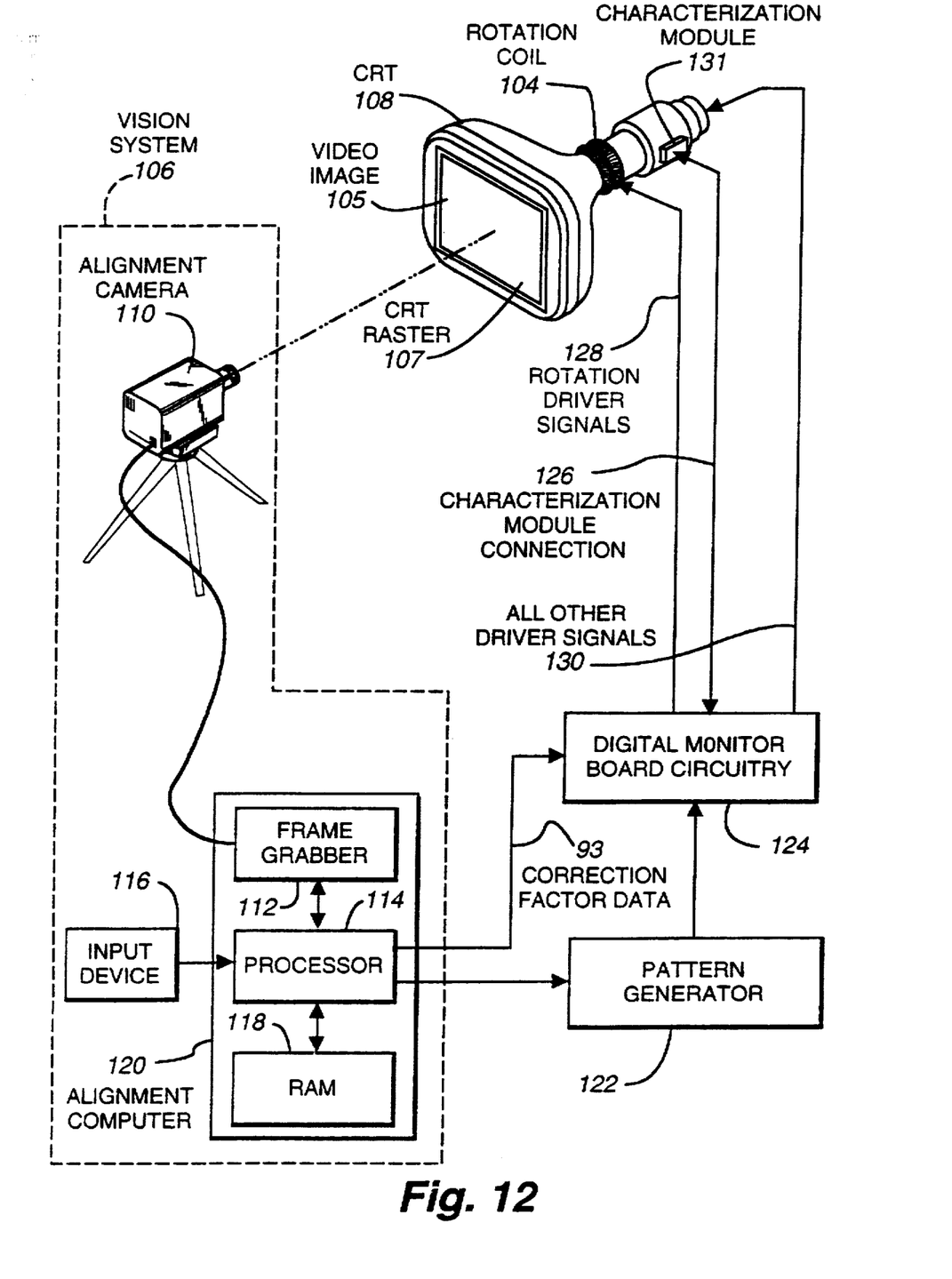
FIG. 12 is a schematic illustration of a vision system that is employed in accordance with the present invention.

FIG. 12 discloses a schematic illustration of the use of a vision system 106 to measure rotational distortion data of CRT raster 107 to affect the alignment of raster 107 displayed upon a CRT 108. An alignment camera 110 is positioned to image raster 107. Frame grabber 112 is used to obtain a single frame image of raster 107 or a video image 105 displayed on raster 107. The vision system 106 measures rotational distortion characteristics and calculates rotational correction factor data that is stored in memory 118. Alignment computer 120 comprises frame grabber 112, processor 114, random access memory 118, and a keyboard or input other device 116 for operator input to the alignment computer 120. Alignment computer 120 is also coupled to a pattern generator 122 that generates the raster test pattern that is transmitted through the digital monitor board 124 to produce video image 105 that is displayed on the CRT 108. Digital monitor board circuitry 124 may also transfer the rotational correction factor data 93 via connection 126 for later use in calculating time variable rotation driver signals 128. The digital monitor board circuitry 124 also applies the time variable rotation driver signals 128 to the CRT rotation coil 104 through connection 128 to correct rotational distortion characteristics of the CRT raster 107. Connection 130 depicts other driver signals being sent to CRT deflection and control windings and electron guns. Also illustrated in FIG. 12, vision system 106 is used to generate correction factor data by employing techniques described in U.S. patent application Ser. Nos. 08/638,222 filed Apr. 26, 1996 by James R. Webb, et al., entitled "Screen Mapping of a Cathode Ray Tube." Vision system 106 may also be used to generate term multipliers that are used in conjunction with transformation equations which are normally stored with the CRT monitor such as may be described in U.S. Pat. No. 5,216,204 issued to James R. Webb, et al., entitled "Automatic Precision Video Alignment System" and U.S. patent application Ser. No. 08/611,098 filed Mar. 5, 1996 by James R. Webb, et al., entitled "Method and Apparatus for Making Corrections in a Video Monitor."

Figure 13:
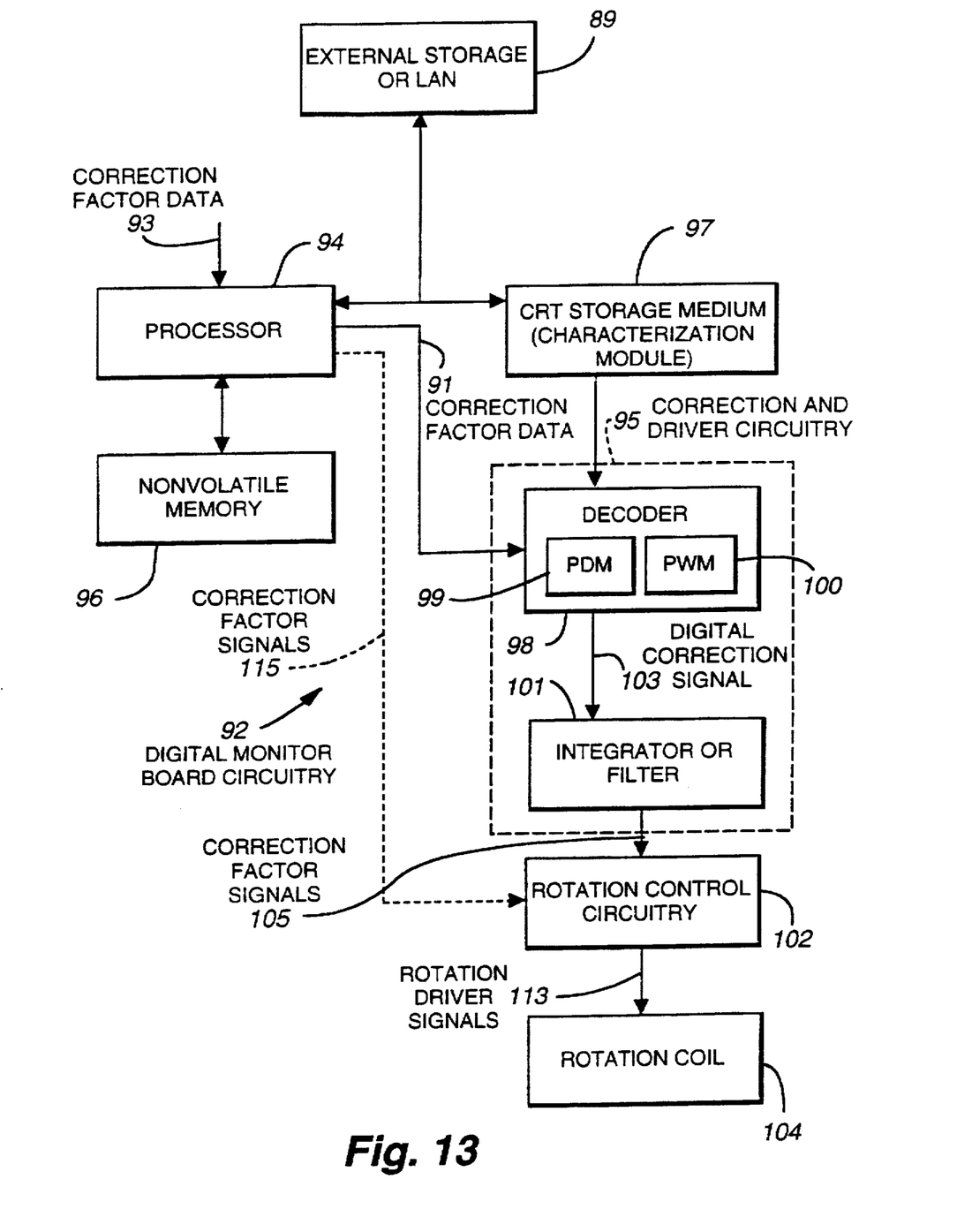
FIG. 13 is a schematic illustration of typical digital monitor board circuitry as used in conjunction with a vision system of the present invention.

FIG. 13 is a schematic block diagram of digital monitor board circuitry 92 that may be used by either a CRT manufacturer or monitor manufacturer in conjunction vision system 106 to generate rotational correction factor data. In either case, the rotational correction factor data is transmitted from the vision system 106 (FIG. 12) and alignment computer 120 (FIG. 12) via connector 93 to processor 94 of digital monitor board circuitry 92. Processor 94 communicates with nonvolatile memory 96 to store the rotational correction factor data. When the CRT is being aligned by a CRT manufacturer rather than a monitor manufacturer, the processor 94 may transfer the rotational correction factor data to the CRT characterization module 97 for storage and later use. Alternatively, the rotational correction factor data may be transmitted to and stored externally in external storage or LAN 89 for later retrieval and use. In all cases when the stored rotational correction factor data is to be decoded, it is transmitted via connection 91 to correction and driver circuitry 95 for further use in generating the necessary time variable rotation driver signals 113 needed to align the CRT raster.

As also shown in FIG. 13, correction and driver circuitry 95 comprises a decoder 98 and integrators and filters 101. Decoder 98 may include a pulse density modulator 99 and/or a pulse width modulator 100 that are capable of decoding correction factor data 91 and to generate digital correction signals 103 in response to correction factor data 91 from processor 94. The use of pulse width modulators and pulse density modulators is more fully disclosed in U.S. patent application Ser. No. 08/611,098 filed Mar. 5, 1996 by James R. Webb, et al., entitled "Method and Apparatus for Making Corrections in a Video Monitor" and U.S. patent application Ser. Nos. 08/638,222 filed Apr. 26, 1996 by James R. Webb, et al., entitled "Screen Mapping of a Cathode Ray Tube," which have been incorporated above. As additionally shown in FIG. 13, after the digital rotational correction factor data transferred from processor 94 has been decoded and conditioned by correction and driver circuitry 95, the correction factor signals are transferred to rotation control circuitry 102 for further conditioning. Rotation control circuitry 102 produces rotation driver signals 113 that are transmitted to the CRT rotation coil 104 to effect the synchronous alignment of the CRT raster.

In some situations, rotational correction factor data 93 from a vision system alignment computer 120 may be transmitted to the digital monitor board processor 94 from the vision system in the form of term multipliers. These term multipliers are then applied to transformation equations stored in non-volatile memory 96 by the digital monitor board processor 94 to generate rotational correction factor signals 115.

As in previous examples, the rotational correction factor signal is then transmitted to rotational control circuitry 102 to be conditioned and used to generate time variable rotation driver signals 113. The rotation driver signals 113 are then applied to the CRT rotation coil 104 to effect the synchronous alignment of the CRT raster.

Figure 14:
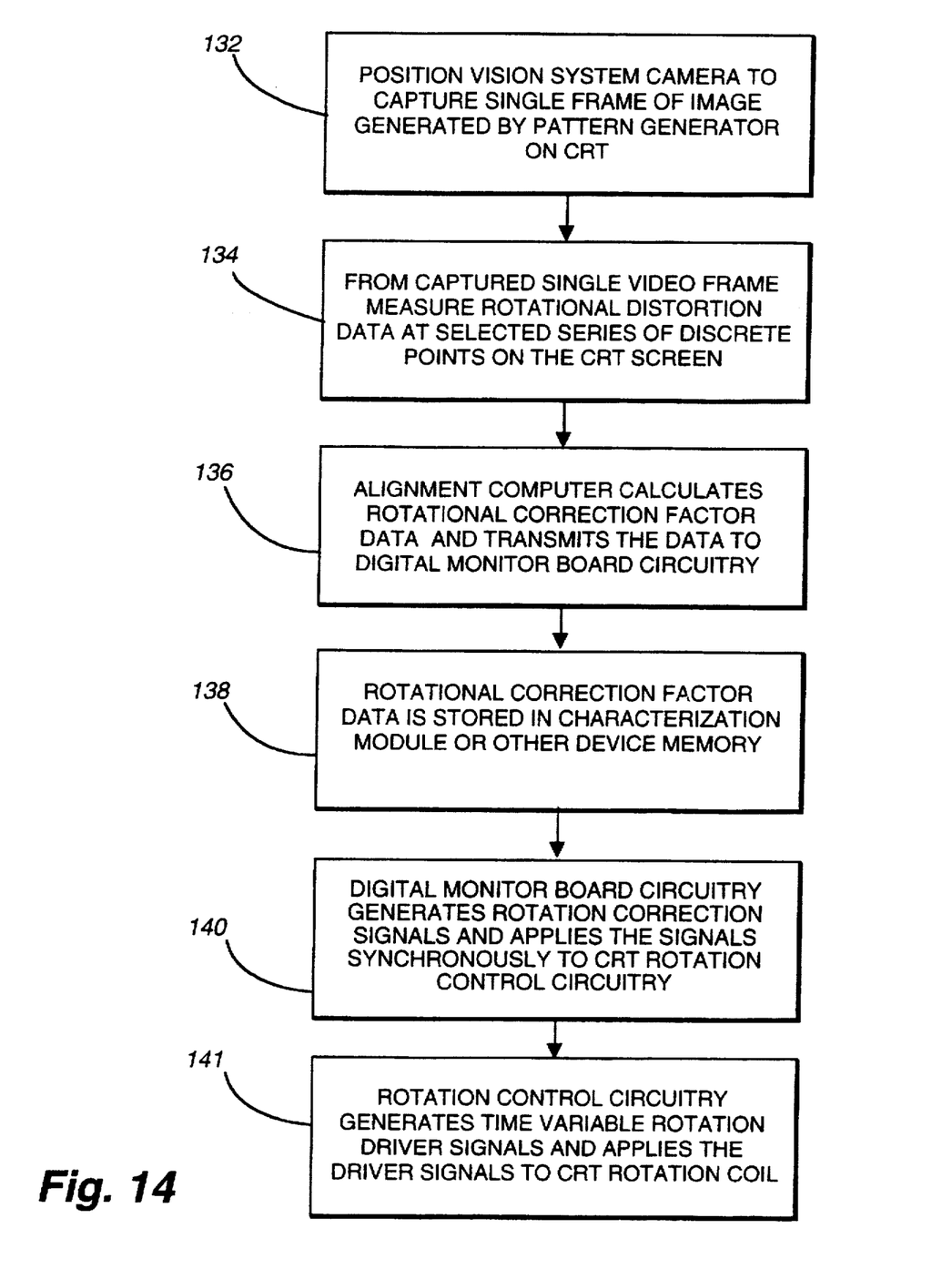
FIG. 14 is a schematic flow diagram that describes the operation of a vision system and digital monitor board circuitry to generate rotation driver signals.

FIG. 14 is a schematic flow diagram of the steps performed when using a vision system to align the raster on a CRT. At step 132, the vision system camera is positioned to capture a single frame of a test pattern image generated by the pattern generator on the CRT. At step 134, the rotational distortion data of the single captured video frame is measured for a pre-selected series of discreet locations on the CRT screen. At step 136, the alignment computer uses the rotational distortion characteristic measurements to calculate rotational correction factor data to be transmitted to the digital monitor board circuitry. At step 138, the digital rotational correction factor data may be stored in the characterization module on the CRT, or if the CRT does not have a characterization module, in other memory associated with the digital monitor board circuitry. At steps 140 and 141, the digital monitor board circuitry decodes, integrates and filters the rotational correction data in order to generate time variable rotation driver signals 113 (FIG. 13), which are then applied synchronously to the CRT rotation coil to align CRT raster.

Figure 15:
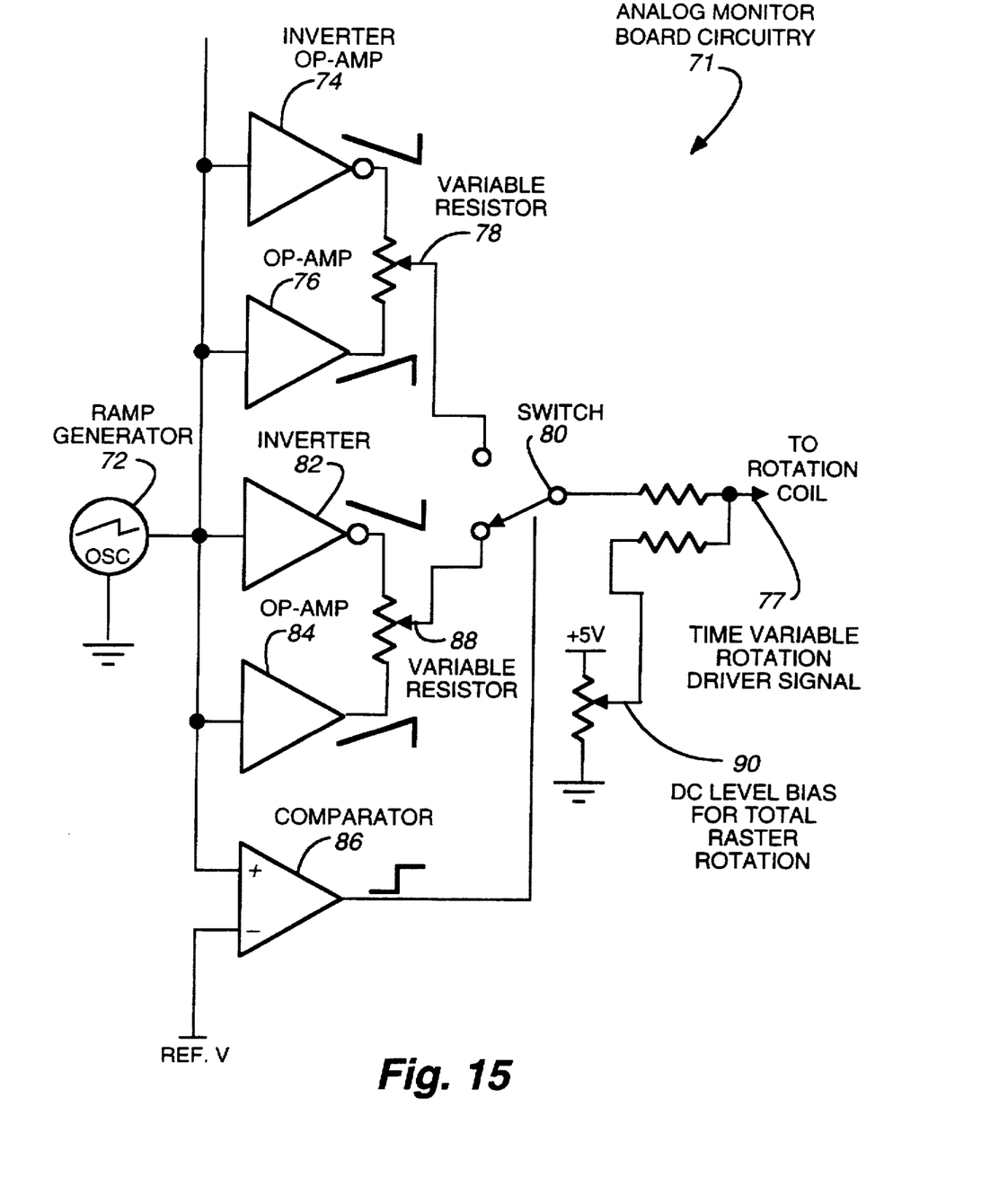
FIG. 15 is a schematic circuit diagram of another embodiment of the present invention that utilizes an analog waveform generator for generating time variable rotation driver signals to synchronously aligning of a CRT raster.

A typical analog embodiment of the invention s disclosed in FIG. 15. FIG. 15 discloses a schematic circuit diagram of analog monitor board circuitry 71 for generating time variable rotation driver signals 77 to synchronously align the top half of a CRT raster independent of the bottom half of the CRT raster. A ramp generator or oscillator 72 is connected to an inverter 74 and op-amp 76 for the top half of the raster and to another inverter op-amp 82 and op-amp 84 for the bottom half of the raster. Variable resister 78 is connected between inverter op-amp 74 and op-amp 76. Variable resistor 778 controls raster rotation for the top half of the raster. Similarly, variable resistor 88 is connected between inverter op-amp 82 and op-amp 84 and controls raster rotation for the bottom half of the raster. When either variable resistor 78 or 88 is adjusted to the bottom of its range, it produces a normal positive ramp signal. When the variable resistors are adjusted to the mid-points, the ramp and inverted ramp add to produce a null or zero output. In this manner, variable resistor 78 for the top half of the raster may generate a time variable rotation driver signal of any combination of the ramp and inverted ramp signals to align the top half of the CRT raster independently of the time variable rotation driver signal generated in the same manner by variable resistor 88 to align the bottom half of the CRT raster. Of course, the number of variable resistors used may vary as desired to correct a corresponding number of sections of the raster. Also, various types of signal waveform generators may be used to produce the desired waveform for the time variable rotation driver signal. The variable resistors can comprise standard manual pontentiometers or can be digital potentiometer.

Also shown in FIG. 15, outputs or variable resistors 78 and 88 are monitored by a comparator 86, which switches the rotation driver signal at the proper time from the raster top half signal to the raster bottom half signal in a synchronous manner as the raster is being scanned.

Also included in the analog monitor board circuit is a DC level bias 90, which allows rotation of the complete time variable composite signal generated during one complete scan of the raster.

Figure 16:
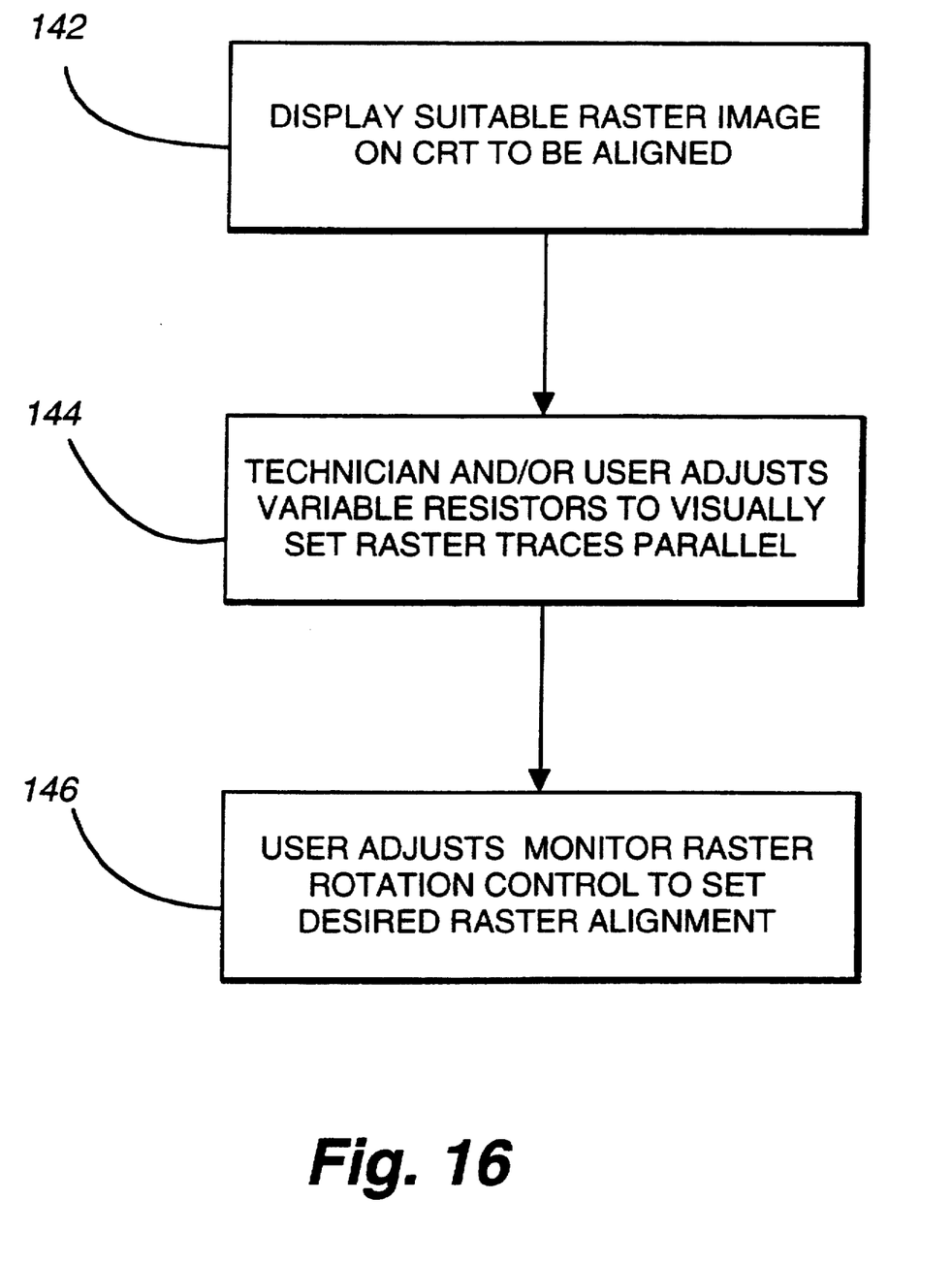
FIG. 16 is a schematic flow diagram that illustrates the steps for visually aligning a CRT raster using the circuit depicted in FIG. 15.

FIG. 16 discloses a schematic flow diagram illustrating the manner in which the embodiment of FIG. 15 of the present invention can be employed to align a CRT raster 107. At first step 142, a suitable raster or video image test pattern is displayed on the cathode ray tube to be aligned. At step 144, variable resistors 78 and 88 for each section of the raster to be aligned independently so that the raster horizontal traces are set so that they are parallel to one another. The variable resistors are typically part of the analog monitor board circuitry and may be adjusted at the monitor factory. After the raster traces are set parallel at step 144, variable resistor 90 is used to adjust the overall raster rotation at step 146. Variable resistor 90 may comprise a user control or may be set at the factory. Variable resistor 90 adjusts the DC level bias variable resistor which controls the overall rotation of the already internally aligned CRT raster.

The present invention, therefore, provides a novel and unique method and apparatus for synchronous rotational alignment of cathode ray tube (CRT) rasters during one vertical scan. The necessary rotation driver signal can either be generated automatically in response to CRT alignment with a vision system or manually generated by technician and or user adjustments to analog monitor board circuitry. The system is capable of using either digital or analog waveforms, generated in response to CRT distortion data, to effect dynamic alignment of the CRT raster. Unlike prior static methods of raster rotation the present invention allows independent dynamic rotation of separately defined CRT raster sections so that the totality of the scans comprising the CRT raster can be synchronously aligned while the raster is being traced.

The foregoing description of the invention has been presented for purposes of illustration and description. It is not intended to be exhaustive or to limit the invention to the precise form disclosed, and other modifications may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention, except insofar as limited by the prior art.

What is claimed is:

1. A system for measuring rotational correction factor data representative of rotational distortion characteristics of a cathode ray tube raster and for generating time variable rotation driver signals to synchronously align said cathode ray tube raster during each scan comprising:

a pattern generator that generates a video pattern that is displayed on said cathode ray tube;

an alignment camera that generates image signals representative of said video pattern;

an alignment computer that captures said image signals of said video pattern, measures rotational distortion characteristics at a series of discrete locations on said cathode ray tube and generates said rotational correction factor data from said distortion characteristics;

monitor circuitry that generates said time variable rotation driver signals in response to said rotational correction factor data and applies said time variable rotation driver signals synchronously to rotation coil circuitry during each scan to align said cathode ray tube raster.

2. The system of claim 1 wherein said alignment computer comprises:

a frame grabber that captures said image signals;

a memory that stores image characteristics and, a processor that calculates rotational correction factor data.

3. A system for measuring and storing rotational correction factor data representative of rotational distortion characteristics of a cathode ray tube raster and for generating time variable rotation driver signals to synchronously align said cathode ray tube raster during each scan comprising:

a pattern generator that generates a video pattern that is displayed on said cathode ray tube;

an alignment camera that generates image signals representative of said video pattern;

an alignment computer that captures said image signals of said video pattern, measures rotational distortion characteristics at a series of discrete locations on said cathode ray tube and generates said rotational correction factor data from said distortion characteristics;

a characterization module coupled to said cathode ray tube that stores said rotational correction factor characteristics;

monitor circuitry that generates said time variable rotation driver signals in response to said rotational correction factor data and applies said time variable rotation driver signals synchronously during each scan to rotation coil circuitry to align said cathode ray tube raster.

4. The system of claim 3 wherein said alignment computer comprises:

a frame grabber that captures said image signals;

a memory that stores image characteristics; and a processor that calculates rotational correction factor data.

5. A method of generating and storing rotational correction factor data relating to the rotational distortion characteristics of a cathode ray tube comprising the steps of:

generating said rotational correction factor data for a plurality of discrete locations on said cathode ray tube using a vision system;

storing said rotational correction factor data with said cathode ray tube for later use in aligning the raster on said cathode ray tube.

6. The method of claim 5 further comprising the step of providing said rotational correction factor data on a disk.

7. The method of claim 5 further comprising the step of providing said rotational correction factor data on a network.

8. The method of claim 6 further comprising the step of retrieving said rotational correction factor data from said disk by using an identification number identifying said cathode ray tube.

9. The method of claim 7 further comprising the step of retrieving said rotational correction factor data from said network using an identification number identifying said cathode ray tube.

10. A system for measuring rotational correction factor data representative of rotational distortion characteristics of a cathode ray tube raster and generating rotation driver signals to align said cathode ray tube raster during each vertical scan comprising:

a pattern generator that generates a video pattern that is displayed as a video image on said cathode ray tube;

an alignment camera that generates image signals representative of said video image;

an alignment processor that captures said image signals of said video pattern measures rotational distortion data and generates rotational correction factor data from said rotational distortion data;

monitor circuitry that generates said rotation driver signals in response to said rotational correction factor data and synchronously applies said rotation driver signals during each scan to a rotation coil to align said cathode ray tube raster.

11. The system of claim 10 wherein said monitor circuitry comprises:

a memory to store said rotational correction factor data for said cathode ray tube;

a decoder that transforms said rotational correction factor data into decoded correction signals;

a logic device that transfers said rotational correction factor data into decoded correction signals;

a logic device that transfers said rotational correction factor data to said decoder;

rotational control circuitry that generates said rotation driver signals in response to said decoded correction signals.

12. Monitor circuitry for generating time variable rotational correction signals for driving a cathode ray tube rotation coil synchronously during each scan to produce an aligned raster on a cathode ray tube comprising:

a memory that stores rotational distortion data of said cathode ray tube;

correction and driver circuitry that uses said rotational correction factor data to generate said rotation driver signals to synchronously drive said cathode ray tube rotation coil circuitry during each scan.

13. The monitor circuitry of claim 12 further comprising:

a processor that transfers said rotational correction factor data to said correction and drier circuitry.

14. The monitor circuitry of claim 12 wherein said correction and driver circuitry further comprises:

integrators that integrate said rotational correction factor data to produce time variable rotation driver signals.

15. The monitor circuitry of claim 12 further comprising:

a memory that stores transformation equations representative of rotational distortion characteristics and term multipliers that comprise said rotational correction factor data;

a processor that generates rotation correction factor signals from said term multipliers and said transformation equations;

rotation control circuitry that generates said rotation driver signals and synchronously transfers said rotation driver signals to a cathode ray tube rotation coil to align said cathode ray tube raster.

16. The monitor circuitry of claim 14 wherein said correction and driver circuitry further comprises:

decoders that transform and transfer said rotational factor correction data to said integrators.

17. The monitor circuitry of claim 16 wherein said decoders comprise;

Pulse width modulators that generate pulse width modulation signals having a predetermined pulse width in response to said rotational correction factor data.

18. The monitor circuitry of claim 16 wherein said decoders comprise:

pulse density modulators that generate pulse density modulation signals having a predetermined pulse density in response to said correction factor data.

19. A method of generating an aligned raster on a cathode ray tube comprising the steps of:

generating rotational correction factor data from rotational distortion data measured for more than one location on a cathode ray tube raster;

decoding said rotational correction factor data;

generating time variable rotation driver signals in response to said rotational correction factor data;

applying said time variable rotation driver signals during each scan to produce said aligned raster on said cathode ray tube.

20. The method of claim 19 further comprising the step of storing said rotational correction factor data on a nonvolatile electronic storage device mounted on said cathode ray tube.

21. The method of claim 19 further comprising the step of storing said correction factor data on a storage disk.

22. The method of claim 19 further comprising the step of storing said correction factor data a magnetic strip.

23. The method of claim 19 further comprising the step of storing said correction factor data on a bar code.

24. The method of claim 19 wherein said step of decoding said rotational correction factor data and generating rotation driver signals comprises the steps of:

generating pulse width modulation signals to produce analog rotation driver signals that are applied to rotational control circuitry to align said cathode ray tube raster.

25. The method of claim 19 wherein said step of decoding said rotational correction factor data and generating said time variable rotation driver signals comprises the steps of:

generating pulse density modulation signals from said rotational correction factor data;

integrating said pulse density modulation signals to produce analog rotation driver signals that are applied to rotation control circuitry to align said cathode ray tube raster.

26. The method of claim 19 wherein said step of decoding said rotational correction factor data and generating time variable rotation driver signals comprise the steps of:

generating a digital correction signal from said rotational correction factor data;

integrating said digital signal to produce an analog correction factor signal that is applied to rotation control circuitry to align said cathode ray tube raster.

27. The method of claim 19 further comprising the step of using rotational correction factor data in the form of term multipliers that are multiplied by common transformation equations stored with said digital monitor board.

28. The method of claim 19 wherein said step of generating rotational correction factor data comprises the step of producing an analog correction factor signal by multiplying rotational correction factor data, in the form of term multipliers, by transformation equations stored with said digital monitor board.

29. The method of claim 19 wherein said step of generating rotational correction factor data comprises the step of using a gain matrix table to compute said rotational correction factor data from said gain matrix table that describes the relationship between correction factor data for a plurality of correction factor parameters.

30. A method of generating rotational correction factor data representative of rotational distortion characteristics of a cathode ray tube and using said rotational correction factor data for synchronously aligning a raster on said cathode ray tube comprising the steps of:

generating said rotational correction factor data for a plurality of discrete locations on said cathode ray tube using a vision system;

generating time variable rotation driver signals from said rotational correction factor data to synchronously align said raster on said cathode ray tube.

31. A system for optically measuring rotational correction factor data representative of the rotational distortion characteristics of a cathode ray tube raster for a plurality of locations on said cathode ray tube raster and generating a time variable rotation driver signal to synchronously apply to said cathode ray tube rotation coil during each vertical scan to align said cathode ray tube raster during each said vertical scan comprising:

a pattern generator that generates and displays a raster pattern on said cathode ray tube;

waveform generators that generate and synchronously apply a time variable rotation driver signal to said cathode ray tube rotation coil during each vertical scan;

an additional variable resistor to generate a bias signal that is capable of simultaneously rotating all of the traces produced during each vertical scan of said cathode ray tube raster.

32. The system of claim 31 wherein said waveform generators comprise:

an oscillator to generate a time variable signal;

a plurality of op-amps and inverters to condition said time variable signal;

a plurality of variable resistors to adjust outputs of said op-amps and inverters to generate said time variable rotation driver signal;

a comparator to time and switch between said variable resistor outputs to synchronously apply said time variable rotation driver signal to said cathode ray tube rotation coil circuitry.

33. A method of optically aligning a cathode ray tube raster by independently aligning sections of said cathode ray tube raster using a time variable rotation driver signal comprising the steps of:

displaying a video image of a raster test pattern on said cathode ray tube;

adjusting a variable resistor for each said independent raster section to generate said time variable rotation driver signal that varies as each raster section is scanned;

adjusting an additional variable resistor to generate a bias signal that is capable of rotating each trace of said cathode ray tube raster simultaneously.

34. A system for synchronous alignment of a cathode ray tube raster comprising:

means for measuring distortion data of said cathode ray tube;

means for generating rotational correction factor data from said distortion data;

means for generating time variable rotation driver signals in response to said rotational correction factor data and applying said time variable rotation driver signals synchronously to said cathode ray tube rotation coil during each vertical scan to align said cathode ray tube raster.

* * * * *